United States Patent [19]

Elkins et al.

[11] Patent Number: 4,649,861
[45] Date of Patent: Mar. 17, 1987

[54] PET MAT

[76] Inventors: Marvin Elkins, 8645 Potrero St., San Diego, Calif. 92041; Dwight L. Smith, 1641E W. 242nd St., Harbor City, Calif. 90710

[21] Appl. No.: 764,323
[22] Filed: Aug. 12, 1985
[51] Int. Cl.[4] .............................................. A01K 1/015
[52] U.S. Cl. ........................................ 119/1; 119/156
[58] Field of Search ............................ 119/1, 106, 156; 43/114, 115, 116, 136

[56]  References Cited
U.S. PATENT DOCUMENTS 4,050,417 9/1977 Ellis ..................................... 119/1 X
4,350,122 9/1982 Shotwell ............................ 119/106

Primary Examiner—Hugh R. Chamblee
Attorney, Agent, or Firm—Charles C. Logan, II

[57] ABSTRACT

A pet mat for domestic animals. The mat has a predetermined shape and is formed from a top layer, a bottom layer, and an intermediate layer. The top layer is insect pervious to allow insects such as fleas and ticks to travel into the intermediate layer. A wet or slow drying adhesive is located either on the bottom surface of the top layer, on the top surface of the bottom layer, or in the intermediate layer. The adhesive may be mixed with pheromones or bait to attract the insects or fleas. Once the insects or fleas have touched the adhesive they will not be able to release themselves from it.

14 Claims, 16 Drawing Figures

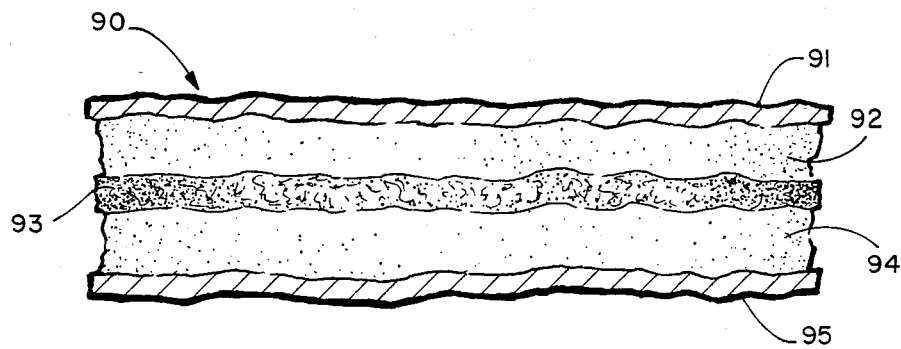
FIG. 12
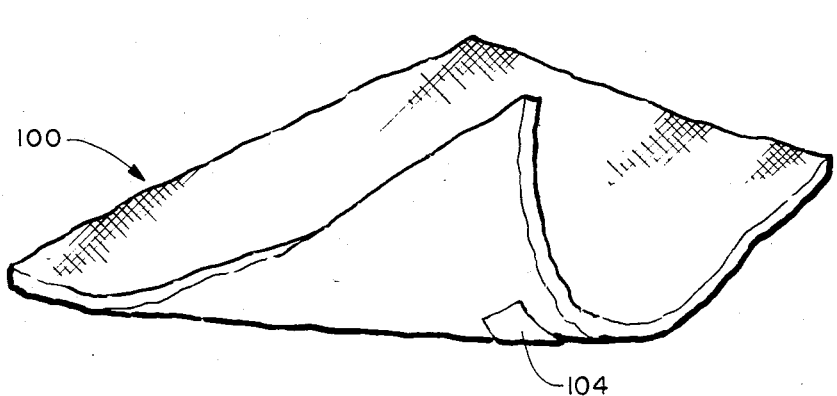
FIG. 13a
FIG. 13b
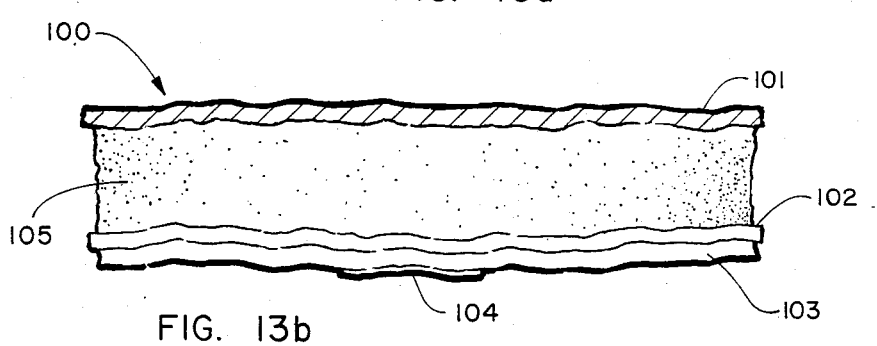
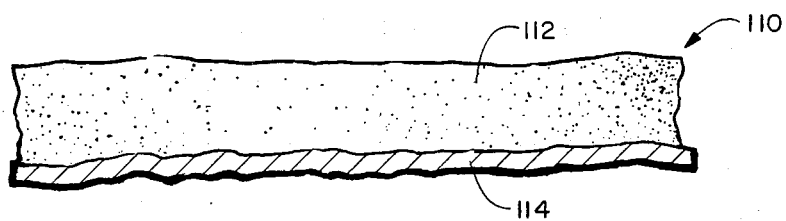
FIG. 14
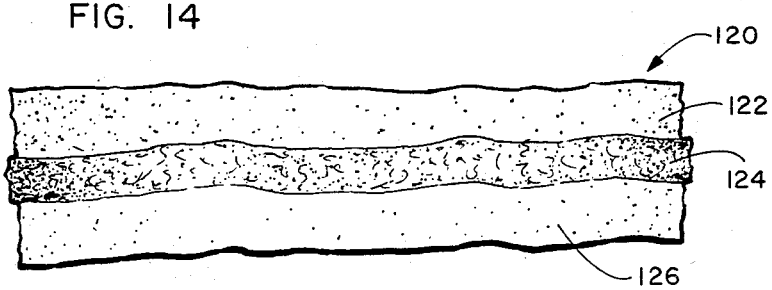
FIG. 15

PET MAT

BACKGROUND OF THE INVENTION

The invention relates to a mat and more specifically to a pet mat designed to control the spread of insects such as fleas and ticks.

Most pet owners are constantly fighting the problem of their pets getting fleas and ticks, and subsequent household infestation. It is well known that pet bedding material has been identified as the major reservoir for fleas and their larvae and eggs. In the past attempts have ben made to get rid of this problem by spraying insectside on the pet or by using insect repellent pet mats. Recently evidence has come to light that some common insecticides present in quanities sufficient to control fleas and ticks may pose a threat of injury to animals continually exposed thereto.

It is an object of the invention to provide a novel pet mat that does not have an insect repellent chemical or volitile insecticide therein.

It is also an object of the invention to provide a novel pet mat that will provide for the immobilization of the insects such as fleas and ticks and their eggs and their larvae so that they may subsequently be disposed of.

It is another object of the invention to provide a novel pet mat that is inexpensive to manufacture and market.

It is a further object of the invention to provide a novel pet mat that is disposable.

SUMMARY OF THE INVENTION

The pet mat is normally where insects such as fleas and ticks spend most of their life. Contrary to common belief, fleas generally spend about ten percent of their life on a pet and are mostly found in the bedding or carpeting where the pet primarily rests. It is here where new eggs are laid and the continual reproduction of this nuisance occurs.

Applicant's novel pet mat has been designed to entrap insects such as fleas and ticks when the pet's body is lying thereon. The pet mat has a pervious top layer through which insects may enter. For purposes of discussing the novel pet mat, the term pervious is meant to convey the meaning that the material is so formed as to allow the volitional movement of the insect or flea but does not lend itself to allowing the skin or hair of the animal to enter and pass through the material. The bottom layer would preferably be of an insect impervious material. The intermediate area between the top layer and the bottom layer has been designed to accommodate a non-drying or slow drying adhesive which would capture the insect instantly upon contact therewith. A variety of constructions are possible using this broad concept. Additionally, the adhesive could also be a substance to destroy or retard the development of larvae, flea eggs, pupae, and/or a substance to discourage chewing by the pet.

DESCRIPTION OF THE DRAWINGS

FIG. 12 is a partial cross-sectional view of a sixth alternative version of the pet mat;

FIG. 13a is a perspective view of a modified version of the fourth alternative version of the pet mat;

FIG. 13b is a partial cross-sectional view of the pet mat illustrated in FIG. 13a;

FIG. 14 is a partial cross-sectional view of a seventh alternative version of the pet mat; and FIG. 15 is a partial cross-sectional view of an eighth alternative version of the pet mat.

DESCRIPTION OF THE PREFERRED EMBODIMENT

Applicant's novel pet mat will be described by referring to FIGS. 1-15 of the drawings. The pet mat is generally designated numeral 10.

Figure 1:
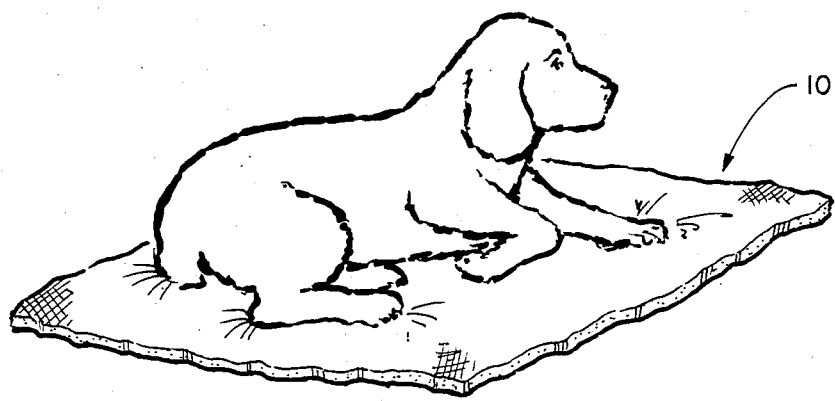
FIG. 1 is a perspective illustrating a household pet lying on applicant's novel pet mat.
Figure 2:
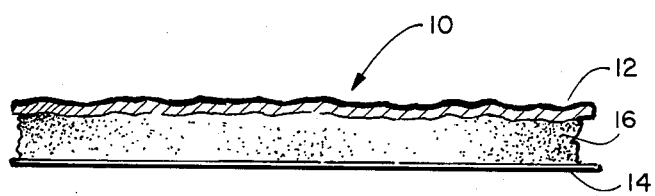
FIG. 2 is a partial cross-sectional elevation view illustrating the construction of the novel pet mat.
Figure 3:
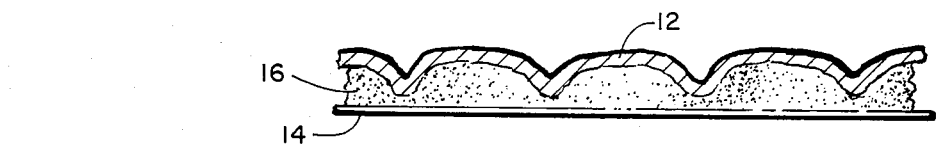
FIG. 3 is a variation in the configuration of the top layer of the pet mat illustrated in FIG. 2.

The first version of the pet mat is illustrated in FIG. 2. It has a top layer of insect pervious material such as Reemay spunbonded polyester scrim 12. The bottom layer 14 would be preferably formed from an insect impervious material such as kraft paper, plastic, metal, wood, etc. The intermediate layer 16 would preferably be formed of an open cell material such as urethane foam and it would be coated with a non-drying or slow drying adhesive. Adhesion of the foam to itself may be prevented by coating that portion of the foam not coated with a silicone or other release emulsion. The foam may be comprised of an elastomer which requires corona treatment or etching to attain an adherent coating of slow drying adhesive. Alternatively, this foam layer may be laterally interrupted by standoff and/or spacers which preclude the collapse of the foam. The adhesive could be a long aging polymer adhesive exhibiting significant tack over several months time (examples include 3M series 300 and 400 acrylic adhesives). In FIG. 3, the top layer has been formed into a quilted formation by an embossing press.

Figure 4:
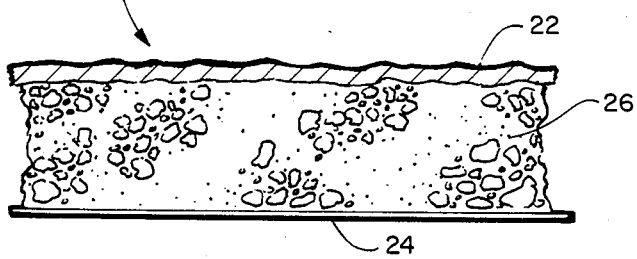
FIG. 4 is a partial cross-sectional view of a first alternative pet mat.

A first alternative version of the pet mat is designated numeral 20 and it is illustrated in FIG. 4. It has a top layer 22 of an insect pervious material. Its bottom layer 24 would preferably be formed of a non-pervious insect material. The intermediate layer 26 would be in the form of asymmetric foam that is either impregnated or covered with a non-drying or slow drying adhesive.

Figure 5:
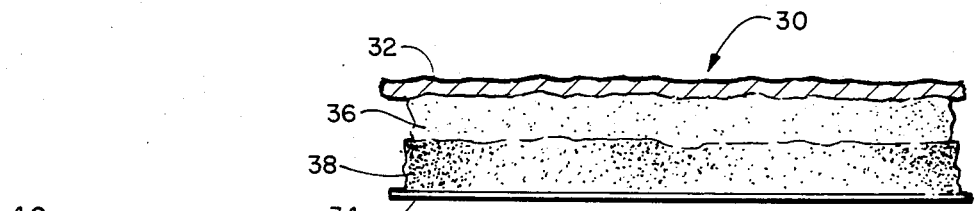
FIG. 5 is a partial cross-sectional view of a second alternative version of the pet mat.

A second alternative version of the pet mat is designated numeral 30 and is illustrated in FIG. 5. It has a top layer of insect pervious material 32 and a bottom layer preferably of non-impervious insect material 34. A layer of dry open cell foam 36 and a layer of wet adhesive foam 38 are positioned intermediate the top and bottom layer.

Figure 6:
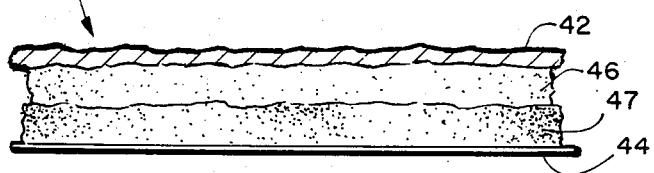
FIG. 6 is a partial cross-sectional view of a third alternative version of the pet mat.

In FIG. 6 a third alternative version of the pet mat is illustrated and identified by the numeral 40. It has a top layer of insect pervious material 42 and a bottom layer preferably of insect impervious mateerial 44. Intermediate these two layers is a layer of open cell foam 46 that has been impregnated from bottom layer 44 up to the adhesive penetration line 47.

Figure 7:
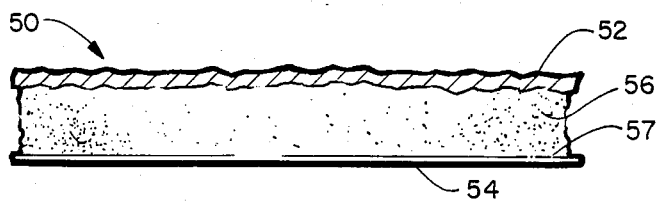
FIG. 7 is a partial cross-sectional view of a fourth alternative version of the pet mat.

In FIG. 7 a fourth alternative version of the pet mat is illustrated and designated by the numeral 50. It has a top layer of insect pervious material 52 and a bottom layer 54 preferably of insect impervious material. The intermediate layer 56 is formed from dry foam and a non-drying or slow drying adhesive 57 is applied to the top surface of bottom layer 54.

Figure 8:
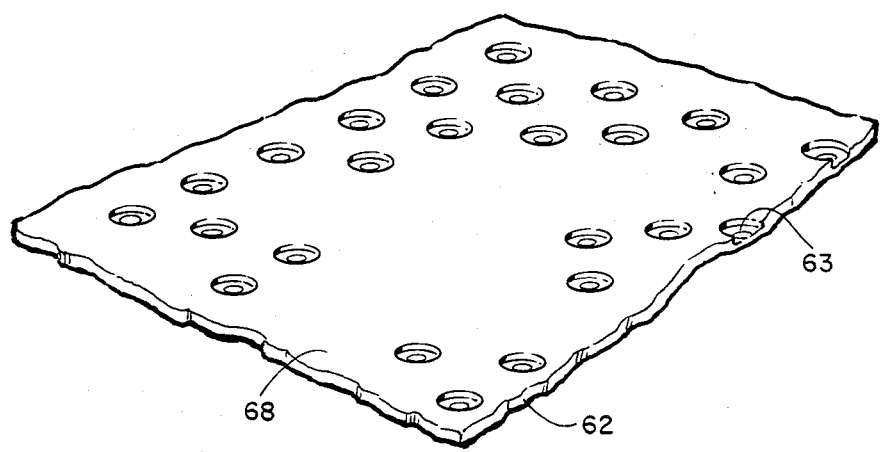
FIG. 8 is a perspective view of the bottom surface of the top layer of a fifth alternative version of the pet mat.
Figure 9:
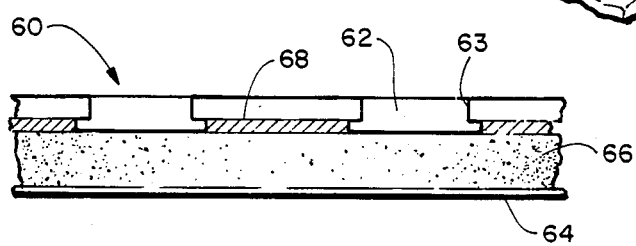
FIG. 9 is a partial cross-sectional view of the fifth alternative version of the pet mat.

A fifth alternative version of the pet mat is illustrated in FIGS. 8 and 9 and is generally designated numeral 60. It has a top layer 62 of insect impervious material having a predetermined number of apertures 63 therein. It has a bottom layer 64 preferably made from an insect impervious material. The intermediate layer is formed of an open cell foam 66. The bottom surface of top layer 62 has a plurality of areas that are coated with a slow or non-drying adhesive 68. These spots are spaced away from the aperture 62 so that hair from the pet which enters the aperture 62 does not come in contact with the adhesive 68.

Figure 10:
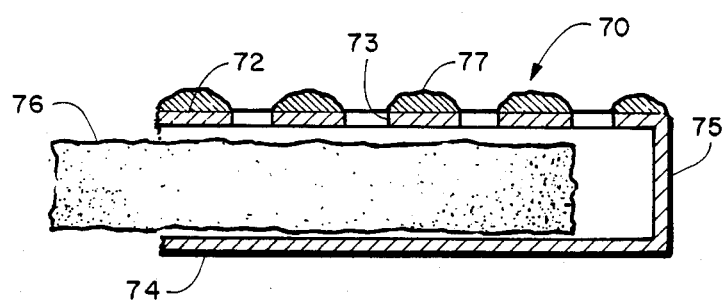
FIG. 10 is a partial cross-sectional view of a modified form of the fifth alternative version of the pet mat.

A modified form of the fifth alternative version of the novel pet mat is illustrated in FIG. 10 and is generally designated numeral 70. It has a top layer 72 of insect impervious material and a bottom layer 74 preferably of insect impervious material. Side walls 75 form a frame for the mat and an intermediate layer of open cell foam 76 that has been impregnated with a non-drying or slow drying adhesive may be inserted and removed from the frame of the mat. The top layer 72 has a predetermined pattern of apertures 73 and has cushion members 77 formed on its top surface.

Figure 11:
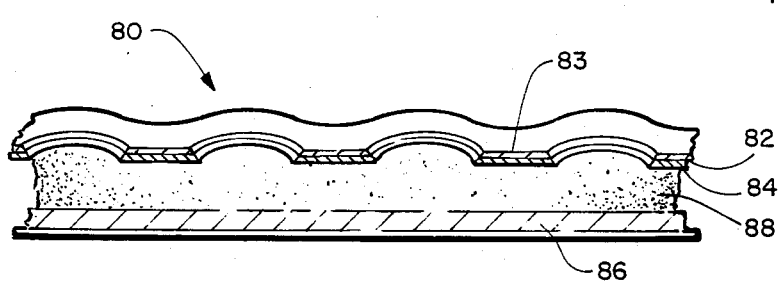
FIG. 11 is another modified version of the fifth alternative version of the pet mat.

Another modified version of the fifth alternative version of the novel mat is generally designated numeral 80 and is illustrated FIG. 11. It has a top layer 82 of insect impervious material and has a predetermined arrangement of apertures 83 therein. The bottom surface of top layer 82 has a non-drying or slow drying adhesive coating 84 thereon. The bottom layer 86 is preferably of an insect impervious material and the interior layer 88 is an open cell foam material.

A sixth alternative version of the pet mat is illustrated in FIG. 12 and it is generally designated numeral 90. It has a top layer 91 and bottom layer 95, both of insect pervious material. Layers 92 and 94 are formed of an open cell foam and they have a layer 93 between them of open cell foam partially saturated with adhesive. This pet mat has been designed so that it can be flipped over and used which should thereby double its useful life.

FIGS. 13a and 13b illustrate a modified version of the fourth alternative version of the novel pet mat. The pet mat 100 has a top layer 101 of insect pervious material and a bottom layer 103 of insect impervious material. Bottom layer 103 would be made of a clear material so that it could be seen through and its top surface would be covered by a clear acrylic adhesive 102 that also could be seen through. A layer of open cell foam 105 would be intermediate the top and bottom layers. A color chart 104 would be printed on the bottom surface of bottom layer 103 along with a comparison dot made from an oxidation prone dye. The remaining life of the pet mat would be indicated by comparing the remaining color of the dot with the color chart or gray scale.

A seventh alternative version of the pet mat is illustrated in FIG. 14 and is designated numeral 110. It has a layer of open cell foam 112 and a bottom layer of insect impervious material 114. A coating of adhesive 113 would cover the top surface of bottom layer 114.

An eighth alternative version of the pet mat is illustrated in FIG. 15 and is designated numeral 120. It has a top layer 122 and a bottom layer 126 of open cell foam. An intermediate layer 124 is formed of open cell foam that has been loaded with an adhesive.

What is claimed is:

1. A pet mat having a predetermined shape comprising:
    a top layer of insect pervious material;
    a bottom layer of predetermined material; and
    means intermediate said top layer and said bottom layer that will cause insects to self adhere to it comprising a layer of open cell foam coated with a non drying adhesive.

2. A pet mat as recited in claim 1 further comprising pheromones or bait mixed in with said adhesive.

3. A pet mat as recited in claim 2 further comprising a wetting agent added to said adhesive.

4. A pet mat having a predetermined shape comprising:
    a top layer of insect pervious material having a predetermined number of holes therein;
    a bottom layer of insect pervious material;
    an intermediate layer of open cell foam; and
    a coating of wet adhesive on the bottom surface of said top layer that is spaced a predetermined distance from any of the holes in said top layer.

5. A pet mat as recited in claim 4 wherein said top and bottom layers are connected by peripheral side walls to form a frame and said intermediate layer of open cell foam is removable as a single unit.

6. A pet mat having a predetermined shape comprising:
    a top layer of insect pervious material;
    a bottom layer of predetermined material; and
    means intermediate said top layer and said bottom layer that will cause insects to self adhere to it comprising a layer of open cell foam coated with a slow drying adhesive.

7. A pet mat having a predetermined shape comprising:
    a top layer of insect pervious material;
    a bottom layer of predetermined material; and
    means intermediate said top and said bottom layer that will cause insects to self adhere to it comprising a layer of asymmetric foam material.

8. A pet mat having a predetermined shape comprising:
    a top layer of insect pervious material;
    a bottom layer of predetermined material; and
    means intermediate said top layer and said bottom layer that will cause insects to self adhere to it comprising a layer of open cell foam formed on top of a layer of wet adhesive foam.

9. A pet mat having a predetermined shape comprising:
    a top layer of insect pervious material;
    a bottom layer of predetermined material; and
    means intermediate said top layer and said bottom layer that will cause insects to self adhere to it comprising a layer of open cell foam of a predetermined height that has been impregnated with a wet adhesive for a predetermined portion of it's height.

10. A pet mat having a predetermined shape comprising:
- a top layer of insect pervious material;
- a bottom layer of predetermined material; and
- means intermediate said top layer and said bottom layer that will cause insects to self adhere to it comprising a wet adhesive coating on the top surface of said bottom layer and a layer of open cell foam located atop said wet adhesive coating.

11. A pet mat having a predetermined shape comprising:
- a top layer of insect pervious material that has been decoratively configured in the manner of embossing;
- a bottom layer of predetermined material; and
- means intermediate said top layer and said bottom layer that will cause insects to self adhere to it.

12. A pet mat having a predetermined shape comprising:
- a top layer of insect pervious material;
- a bottom layer of insect pervious material; and
- means intermediate said top layer and said bottom layer that will cause insects to self adhere to it comprising in this order from top to bottom: a layer of open cell foam, a layer of open cell foam partially saturated with a non drying adhesive or a slow drying adhesive, and another layer of open cell foam.

13. A pet mat having a predetermined shape comprising:
- a top layer of insect pervious material that is formed from open cell foam;
- a bottom layer formed of insect impervious material; and
- means intermediate said top layer and said bottom layer that will cause insects to self adhere to it comprising a coating of adhesive on the top surface of said bottom layer.

14. A pet mat having a predetermined shape comprising:
- a top layer of insect pervious material formed of open cell foam;
- a bottom layer formed from open cell foam; and
- means intermediate said top layer and said bottom layer that will cause insects to self adhere to it comprising a layer of open cell foam loaded with an adhesive that remains tacky for a predetermined time.

* * * * *